(12) United States Patent
Kritchman et al.

(10) Patent No.: US 7,209,797 B2
(45) Date of Patent: Apr. 24, 2007

(54) SYSTEM AND METHOD FOR ACCURATE PRINTING OF THREE DIMENSIONAL MODELS UTILIZING ADJUSTMENT PARAMETERS

(75) Inventors: Eliahu M. Kritchman, Tel Aviv (IL); Dani Chechik, Ramle (IL); Tatyana Rodin-Entin, Modiin (IL); Hanan Gothait, Rehovot (IL)

(73) Assignee: Objet Geometries Ltd., Rehovot (IL)

( * ) Notice: Subject to any disclaimer, the term of this patent is extended or adjusted under 35 U.S.C. 154(b) by 0 days.

(21) Appl. No.: 11/433,513

(22) Filed: May 15, 2006

(65) Prior Publication Data
US 2006/0206227 A1     Sep. 14, 2006

Related U.S. Application Data

(62) Division of application No. 10/336,032, filed on Jan. 3, 2003, now abandoned.

(60) Provisional application No. 60/430,362, filed on Dec. 3, 2002, provisional application No. 60/344,038, filed on Jan. 3, 2002.

(51) Int. Cl.
    G06F 19/00    (2006.01)
(52) U.S. Cl. .................... 700/118; 700/98; 700/119
(58) Field of Classification Search ........ 700/118–120, 700/97–98; 358/1.11, 1.2; 264/401, 497
    See application file for complete search history.

(56) References Cited

U.S. PATENT DOCUMENTS

| | | | |
|---|---|---|---|
| 4,575,330 A | 3/1986 | Hull | |
| 5,136,515 A | 8/1992 | Helinski | |
| 5,204,055 A | 4/1993 | Sachs et al. | |
| 5,287,435 A | 2/1994 | Cohen et al. | |
| 5,340,433 A | 8/1994 | Crump | |
| 5,387,380 A | 2/1995 | Cima et al. | |
| 5,402,351 A | 3/1995 | Batchelder et al. | |
| 5,594,652 A | 1/1997 | Penn et al. | |
| 5,717,599 A | 2/1998 | Menhennett et al. | |
| 5,740,051 A * | 4/1998 | Sanders et al. ............. | 700/119 |
| 5,784,279 A | 7/1998 | Barlage, III et al. | |

(Continued)

FOREIGN PATENT DOCUMENTS

EP     0 852 538     9/1996

(Continued)

OTHER PUBLICATIONS

"Three Dimensional Printing: What is the 3DP™ Process?" http://web.mit.edu/afs/athena/org/t/tdp/www.?.

(Continued)

*Primary Examiner*—Alexander Kosowski
(74) *Attorney, Agent, or Firm*—Pearl Cohen Zedek Latzer, LLP

(57) ABSTRACT

A system and method for building three dimensional objects may adjust data used to build the objects to, for example, improve quality or correct for defects. A printer may, for example, accept data representing the object and modify the data according to an adjustment parameter; the printer may build the object according to the parameter. The parameter may be, for example, fixed in the printer, user entered, and/or calculated by the printer. In one embodiment, a support pedestal may be built of deposited material before the object is built.

8 Claims, 10 Drawing Sheets

U.S. PATENT DOCUMENTS

| | | |
|---|---|---|
| 5,902,537 A | 5/1999 | Almquist et al. |
| 5,943,235 A * | 8/1999 | Earl et al. ................... 700/98 |
| 6,030,199 A | 2/2000 | Tseng |
| 6,126,884 A | 10/2000 | Kerekes et al. |
| 6,136,252 A | 10/2000 | Bedal et al. |
| 6,193,923 B1 | 2/2001 | Leyden et al. |
| 6,259,962 B1 | 7/2001 | Gothait |
| 6,347,257 B1 | 2/2002 | Bedal et al. |
| 6,401,002 B1 * | 6/2002 | Jang et al. ................. 700/119 |
| 6,490,496 B1 | 12/2002 | Dacey |
| 6,508,971 B2 | 1/2003 | Leyden et al. |
| 6,532,394 B1 | 3/2003 | Earl et al. |
| 6,660,209 B2 * | 12/2003 | Leyden et al. .............. 264/401 |
| 6,751,516 B1 * | 6/2004 | Richardson ................ 700/119 |
| 6,782,303 B1 * | 8/2004 | Fong .......................... 700/119 |
| 6,833,234 B1 * | 12/2004 | Bloomstein et al. ........ 430/321 |
| 2002/0011693 A1 | 1/2002 | Leyden et al. |

FOREIGN PATENT DOCUMENTS

| | | |
|---|---|---|
| WO | WO 94/19112 | 9/1994 |
| WO | WO 97/31781 | 9/1997 |
| WO | WO 01/53105 | 7/2001 |

OTHER PUBLICATIONS

Z Corporation, News Release, "Z Corp. Debuts Robust New Materials System", Apr. 2, 1998.

* cited by examiner

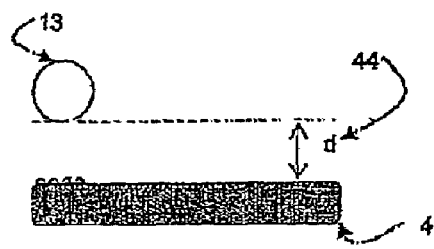
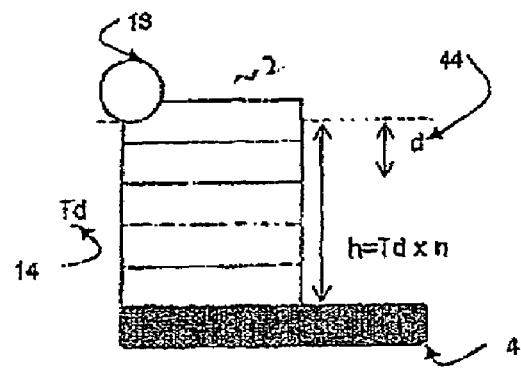
FIG. 7A       FIG. 7B
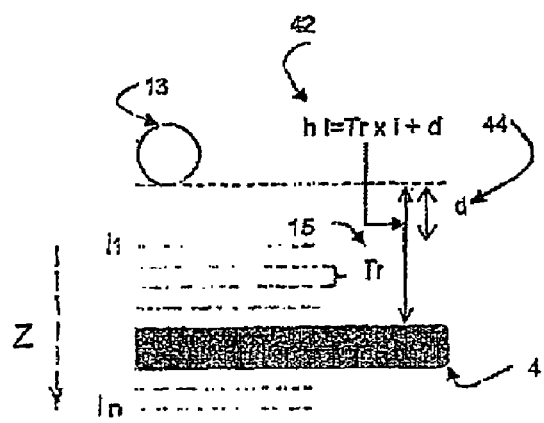
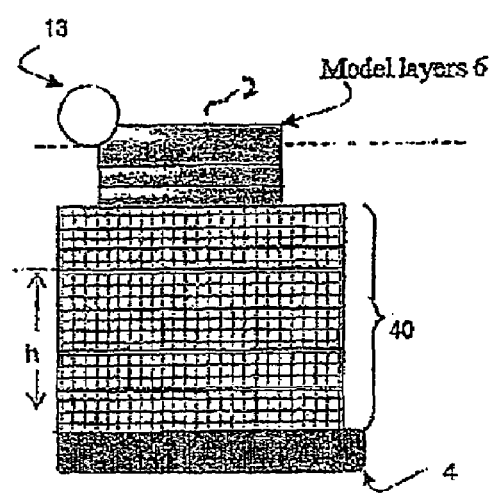
FIG. 7C       FIG. 7D

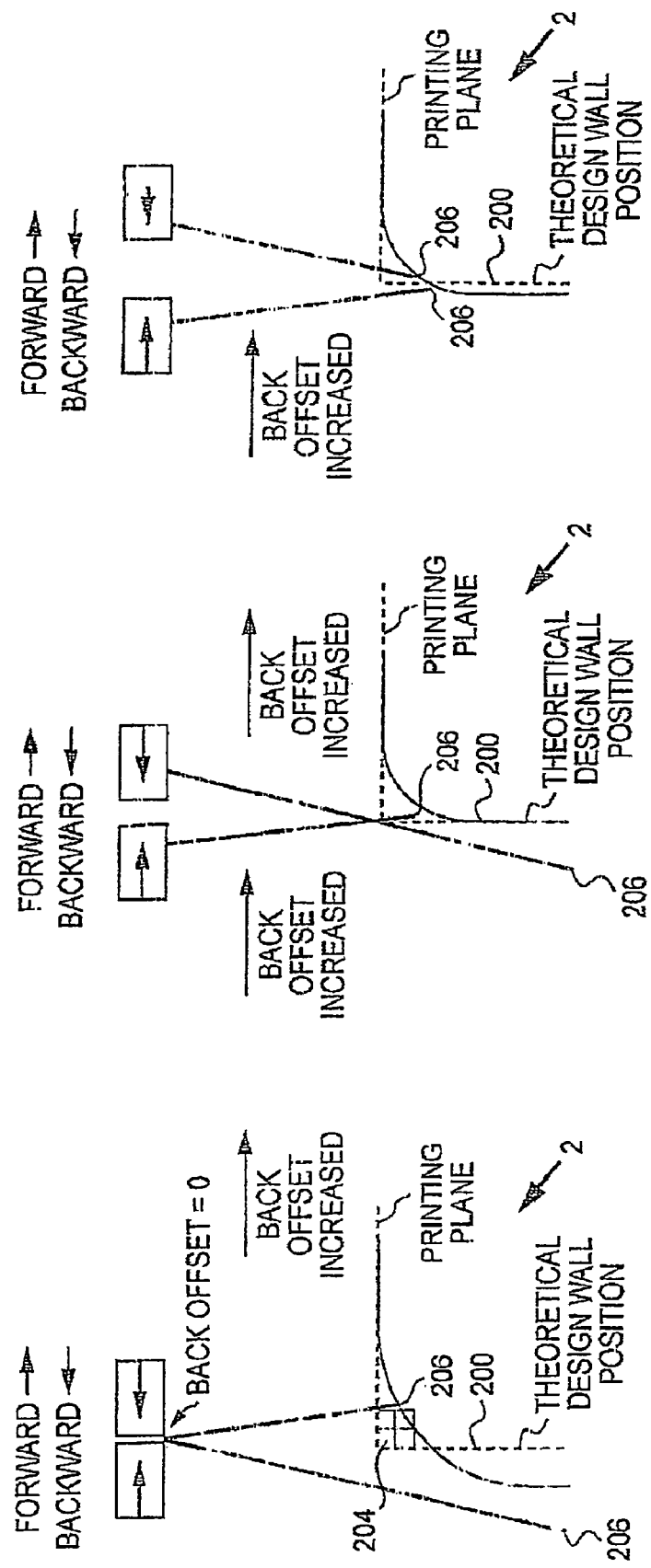

SYSTEM AND METHOD FOR ACCURATE PRINTING OF THREE DIMENSIONAL MODELS UTILIZING ADJUSTMENT PARAMETERS

CROSS REFERENCE TO RELATED APPLICATIONS

This application is a divisional application of U.S. patent application Ser. No. 10/336,032, filed on Jan. 3, 2003 now abandoned, entitled, "DEVICE, SYSTEM AND METHOD FOR ACCURATE PRINTING OF THREE DIMENSIONAL OBJECTS", which claims priority from U.S. provisional patent application Ser. No. 60/344,038, filed Jan. 3, 2002, and entitled, "ACCURATE PRINTING OF THREE DIMENSIONAL OBJECTS", and U.S. provisional patent application Ser. No. 60/430,362, filed Dec. 3, 2002, and entitled "DEVICE, SYSTEM AND METHOD FOR QUALITY PRINTING OF THREE-DIMENSIONAL MODELS".

FIELD OF THE INVENTION

The present invention relates to the field of rapid prototyping (RP), and more particularly to methods of achieving high accuracy of dimensions and high quality in three-dimensional (3D) printing.

BACKGROUND OF THE INVENTION

Rapid prototyping includes many techniques used to produce 3-D objects from computer data representing the 3-D objects. The 3-D data may be referred to as Computer Object Data (COD); other 3-D data may be used. Some specific formats of COD data which may be used are STL data and CAD data; other formats may be used. A common example of COD is Computer Aided Design (CAD) data. The machine's controller converts the data to the form as required by the object building components of the machine. Most of the RP techniques use fluid or fluid-like interface material, which is solidified to produce the solid object. The interface material is usually referred to as build material (BM) or model material. Building the object is usually performed by producing thin layers corresponding to the data and solidifying the layers one upon the other. Solidifying the layers may be achieved in different ways, such as by cooling the layers, in case of using molten wax-like materials, by exposing the BM to electromagnetic irradiation of appropriate wave-length, in case of using a photopolymer as BM, or other methods, such as chemical curing.

Various systems for computerized 3-D printing have been developed. For example a system from 3-D Systems, Inc. of California USA operates on the basis of stereolithography (SL) where a focused ultraviolet laser is scanned over the top of a bath of photopolymerizable liquid polymer material. Specified sections of the surface of the bath are polymerized or cured by contact with the UV laser beam creating a solid plastic layer at or just below the surface of the material. The beam location and thus curing location may be controlled by a printer controller or computer. One method of stereolithography is described in U.S. Pat. No. 6,126,884 issued Oct. 3, 2000 to Kerekes et al. Another technique for building a 3-D model in layers is described by Cima et al., U.S. Pat. No. 5,387,380. A layer of powdered material is deposited followed by the deposit of binding material in selected parts of the powder deposit to form a layer of bound powder in these parts. These steps are repeated for successive layers to form a desired component.

In one technique, the controller of the printer receives, for example, COD data and converts it to the format applicable for the printing process (for example, sliced COD data). The technique is typically based on dispensing typically two materials (other numbers may be used) from, typically, ink-jet heads. The materials are, for example, BM and support material (SM). The BM is dispensed at those locations the object is to be built. The SM is dispensed at other places, provided it is needed there. The BM and SM are typically dispensed simultaneously according to the computer data.

The BM may be a specially formulated photopolymer, which is typically cured by a source of electromagnetic irradiation, for example a flood or wide area of light, which is usually UV, but other wavelengths may be used. The SM is also typically a photopolymer, which is used to support the BM prior to, during and/or after building. The SM is so formulated as to be easily disposed of or removed at the conclusion of the object building process.

The size of the object actually built may differ from the size of the prototype model desired to be built, or from the size as defined by the input data. Even if the inaccuracy is minimal, the error may have serious consequences when, for example, two or more pieces are meant to fit together, and a minor difference in size may render a close, exact fit impossible. An accuracy of, for example, ±0.2 mm may be acceptable in the art of 3-D printing. Larger inaccuracies are less acceptable.

Such inaccuracies may result from various factors, such as material shrinkage or inaccuracies in leveling layers of material. Various other aspects of 3-D printing may reduce quality of printed objects. If more than one material is used, materials may diffuse into each other. Materials may alter their shape after deposition due to, for example, thermal contraction, the tendency of materials to merge, or the chemical reaction of the interface materials to curing. Materials may not be deposited accurately due to, for example, defective or missing print head nozzles or the velocity of the print head. Other factors may cause object creation inaccuracies.

Therefore, there is a need for a device, system and method that reduces inaccuracies in three dimensional printing.

SUMMARY OF THE INVENTION

A system and method for building three dimensional objects may adjust data used to build the objects to, for example, improve quality or correct for defects. A printer according to one embodiment may accept data representing the object and modify the data according to an adjustment parameter; the printer may build the object according to the parameter. The parameter may be user entered, calculated by the printer controller, or both. In one embodiment, a support pedestal may be built of deposited material before the object is built.

BRIEF DESCRIPTION OF THE DRAWINGS

FIG. 7A is a side view of the initial space between the leveling device and the tray or table, according to an embodiment of the present invention.

FIG. 7B is a side view of the leveling device relative to layers of material dispensed beneath the height at which the material first comes into contact with the leveling device, according to an embodiment of the present invention.

FIG. 7C is a side view of the leveling device relative to the tray, according to an embodiment of the present invention.

FIG. 7D is a side view of a pedestal and object being built, according to an embodiment of the present invention.

FIGS. 9a, 9b and 9c depict the path of drops when various offsets are used, according to an embodiment of the present invention.

DETAILED DESCRIPTION

Various aspects of the present invention are described herein. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

U.S. Pat. No. 6,259,962 assigned to the assignee of the present application and incorporated herein by reference, describes, inter alia, an apparatus and method for 3-D model printing. One embodiment includes a printing head having a plurality of nozzles through which interface materials are dispensed and a dispenser connected to the printing head for selectively dispensing interface material in layers onto a printing tray. Electromagnetic radiation, for example, may be used for curing. The location of depositing and the amount and/or type of interface material to be deposited may be controlled by the apparatus' controller using, for example, CAD data. Various embodiments of the present invention may be used with the embodiments described in U.S. Pat. No. 6,259,962; however, the present invention may be used in conjunction with 3-D printers having other configurations and other methods of operation.

In various embodiments of the present invention, in order to limit inaccuracies in rapid prototyping (for example, to ±0.2 mm), modifications may be introduced to the COD data. Such modifications may take into consideration, for example, printing process parameters such as the temperature of the printing cell, layer thickness, type of interface materials, machine construction, repeatable motion errors, the type of ventilation in the printing cell, and/or other information. Modifications may also be made according to embodiments of the present invention to improve the quality of the final printed product.

Figure 1A:
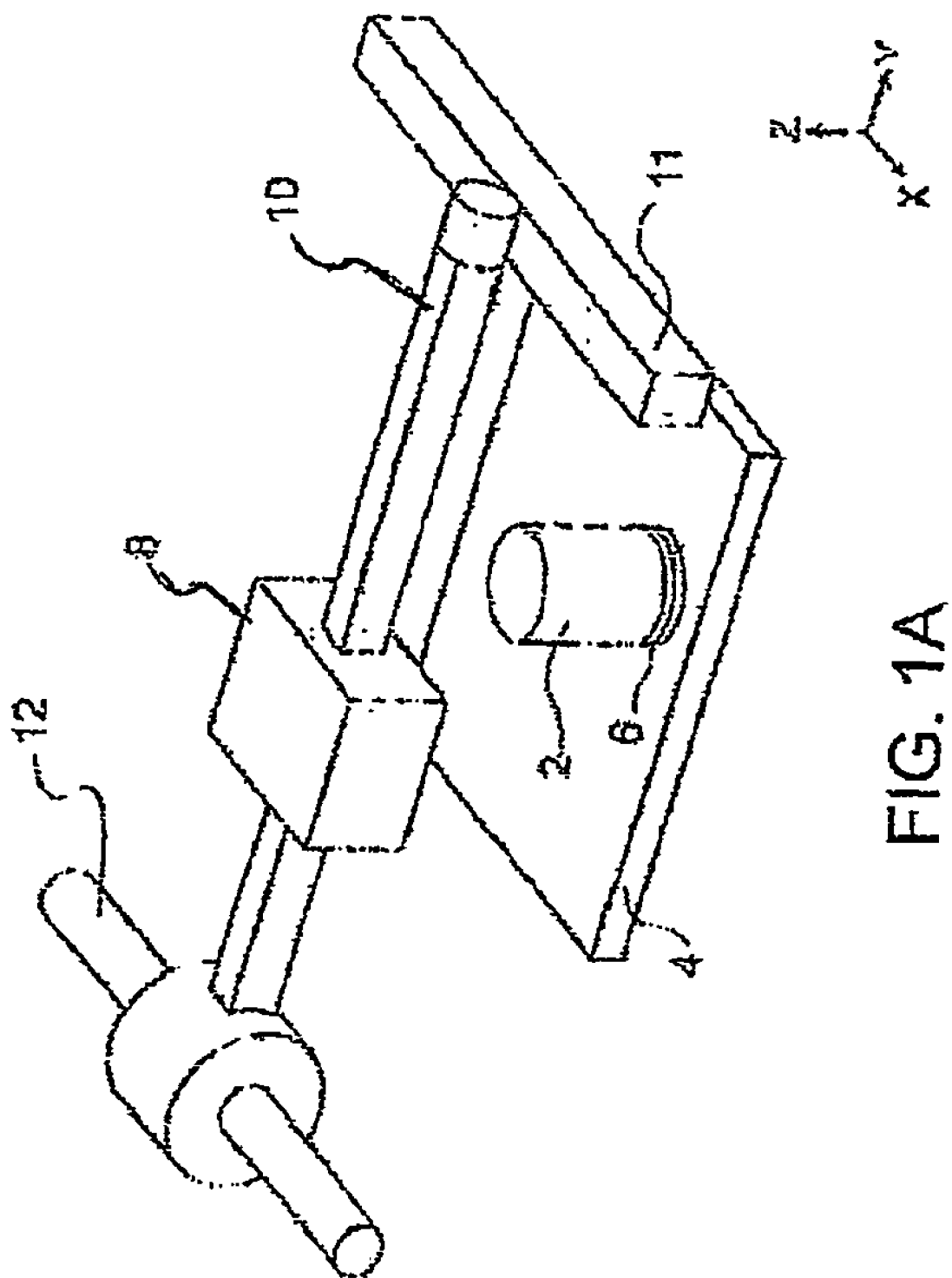
FIG. 1a is a schematic isometric view of a portion of a three dimensional modeling device according to an embodiment of the present invention.

FIG. 1a is a schematic isometric view of a portion of a three dimensional modeling device according to an embodiment of the present invention. Referring to FIG. 1a, a portion of three dimensional printer 1 is depicted. Three dimensional printer 1 may be structured and may operate similarly to embodiments described in U.S. Pat. No. 6,259,962; however, the three dimensional printer 1 may be structured and may operate similarly to 3-D printers having other configurations and other methods of operation.

Three dimensional printer 1 prints a solid object 2 on the table or machine tray 4. The tray 4 is typically movable along the Z-axis. Each step in the Z direction typically conforms to a single layer 6. Only a few layers are shown for clarity. In an alternate embodiment the tray 4 need not be moveable in the Z axis. Printing head 8 (typically an ink jet head, but other dispensing heads may be used) is typically movable along the Y-axis, along rail 10. Printing head 8 typically includes a plurality of nozzles. The nozzles may be arranged in a pattern, such as a line or a rectangular or square grid. In alternate embodiments, only one nozzle may be used. Rail 10 is typically movable along the X-axis on longitudinal rails 11 and 12. Thus printing head 8 is movable in the X-Y plane, to dispense, typically, BM and SM simultaneously, its location and dispensing location being controlled by the controller for the printer 1 (e.g., controller 62 of FIG. 1b). In an alternate embodiment, the printing head 8 may be moveable in a different manner, using different equipment. Further, more than one printing head may be used, whether simultaneously, separately or consecutively. Furthermore, material may be dispensed in a different manner, such as not simultaneously, not by an ink-jet head, with more than two types of material, or by different printing heads or ink-jet heads for each type of material.

Note that while the "Z" direction typically refers to relative vertical positions, "X" and "Y" directions are relative terms, and may be interchangeable across different embodiments. The same relativity applies to terms such as "forward" and "backward."

Figure 1B:
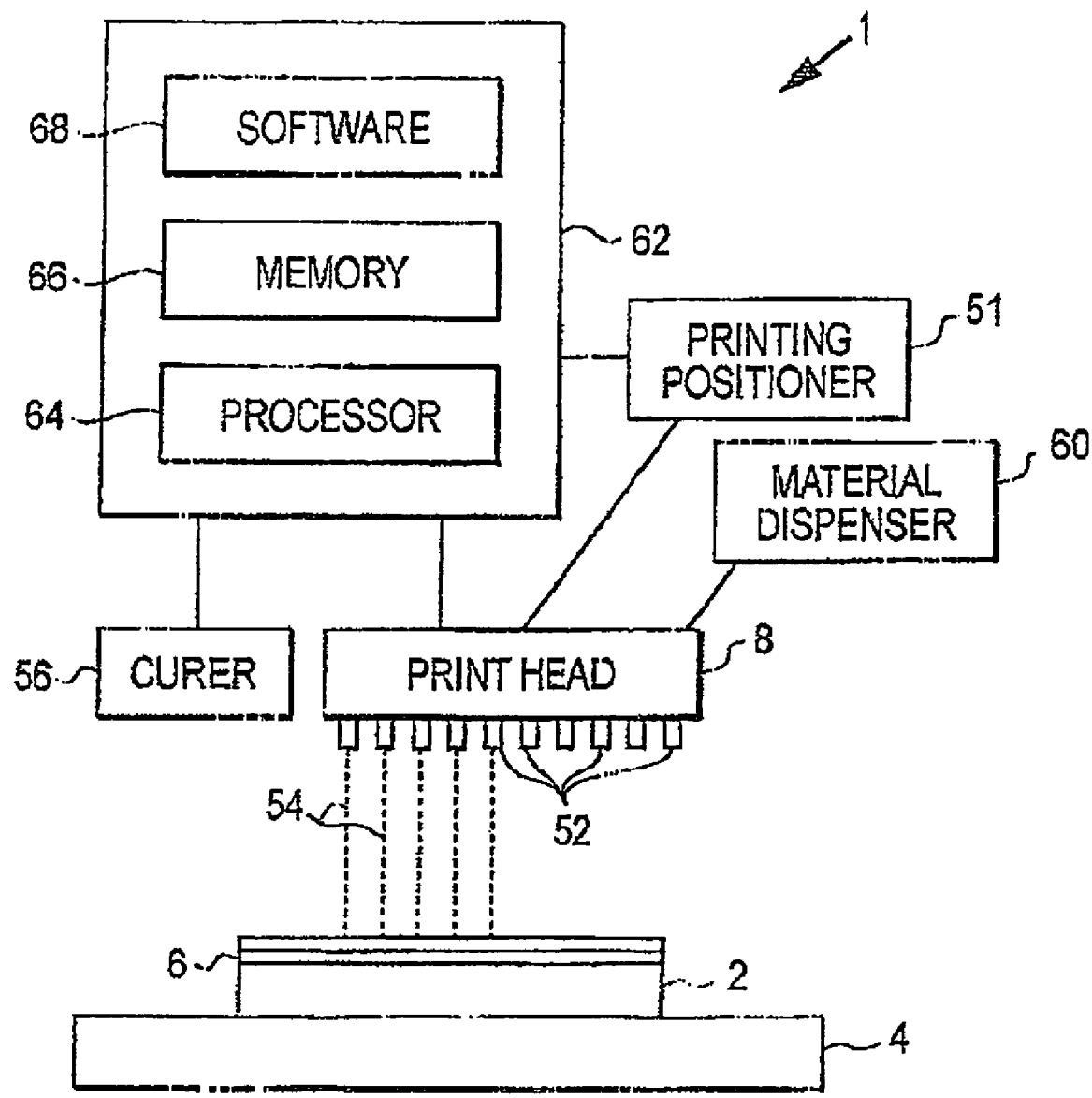
FIG. 1b is a block diagram of a three dimensional modeling device according to an embodiment of the present invention.

FIG. 1b is a block diagram of a three dimensional modeling device according to an embodiment of the present invention. Referring to FIG. 1b, three dimensional printer 1 includes, a printing head 8 having, typically, a plurality of ink-jet nozzles 52, through which one or more interface material(s) 54 are dispensed, and a curing unit 56 for curing the interface material(s) 54 to form the object 2, resting on support surface or tray 4. The interface material(s) 54 are preferably photopolymers, such as DI 7090 Clear Coat, manufactured by Marabuwerke Gmbh & Co., Tamm, Germany. Preferably, the photopolymer contains material curable by electromagnetic irradiation, such as ultra violet (IV), visible or infra red (IR) radiation. For example, material based on reactive acrylates is suitable for UV curing or hardening by the application of UV radiation from curing unit 56. The object 2 is built up in layers such as layers 6 (only a few layers are shown for clarity). The 3-D printing system 1 includes a dispenser 60, and a controller 62 coupled to components such as curing unit 56 and printing head 8. Other materials may be used, and other methods of curing may be used.

A print head positioning unit 51 moves the print head according to commands from a controller 62. Print head positioning unit 51 may include, for example, motors, servos, guide rails, etc.

Controller 62 typically accepts COD representing an object 2, such as CAD data in STL format (other data may be accepted, in other formats) and converts such data to instructions for the various units within the printing system 1 to build the object 2. Before converting the data to command instruction, controller 62 may adjust the COD data according to the various embodiments described herein.

Controller 62 typically accepts data representing an object 2, such as CAD data (other data may be accepted, in other formats) and converts such data to instructions for the various units within the printing system 1 to create the object 2. Controller 62 may, for example, create an intermediate set of data such as COD data or STL data, or other data. Such intermediate data may be adjusted according to the various embodiments described herein. Typically, controller 62 alters data such as intermediate data or instructions sent to the various components of the printer 1 using, for example, an adjustment parameter. Such adjustment parameter may be, for example, an amount (such as a number or pixels, a distance, a percentage or scale, etc.) which is used to modify one or more dimensions of the object 2 or movement distances or positions of the print head. For example, the adjustment parameter may be added to, subtracted to, or be used to multiply or divide various dimensions. The adjustment parameter may include more than one parameter and may include various instructions or details, such as "skip/omit" or head displacement instructions. The adjustment parameter may include data collected from sensors or user input (e.g., from a technician, factory personnel, or possibly an end user), or may include constants, or may be calculated by controller 62. A user may input data including, for example, inaccuracy data which may be used by the controller 62 to calculate an adjustment parameter. The parameter may be, for example, fixed in the printer, user entered, and/or calculated by the printer.

Controller 62 may include a processor 64, a memory 66 and software or operating instructions 68. Processor 64 may include conventional devices, such as a central processing unit, a microprocessor, a "computer on a chip", a microcontroller, etc. Memory 66 may include conventional devices such as RAM, ROM, or other storage devices, and may include mass storage, such as CD-ROM or a hard disk. Controller 62 may be included within or may include a computing device such as a personal computer or workstation. Controller 62 may be of other configurations, and may include other components.

It should be understood that the term "ink-jet nozzles" is used in the context of this application for convenience to include nozzles similar to inkjet nozzles, known in the art, but is not restricted to nozzles for ejecting ink and also includes nozzles for ejecting interface material for the building of 3-D models.

The dispenser 60, which contains interface material 54, is suitably connected to printing head 8. In one embodiment support surface or tray 4 can be selectively positioned in one or more of the X, Y or Z axes by a positioning apparatus (not shown). Alternately, the printing head 8 may be moved in the Z axis.

In one embodiment, material is dispensed using an ink-jet printing head (e.g., printing head 8). The printing head typically moves in a fixed pattern over the top layer of the object. Various patterns may be used, typically involving moving back and forth over the top layer and moving incrementally in one direction at the end of each (or at the end of a series) of passes. For example, in one pattern, the head may move back and forth in the X direction, forward then reverse, then move a small amount in the Y direction before another set of passes. Other patterns may be used, such as a point-to-point pattern according to the CAD data. A "forward" direction without a corresponding "backward" direction may be used.

Figure 2A:
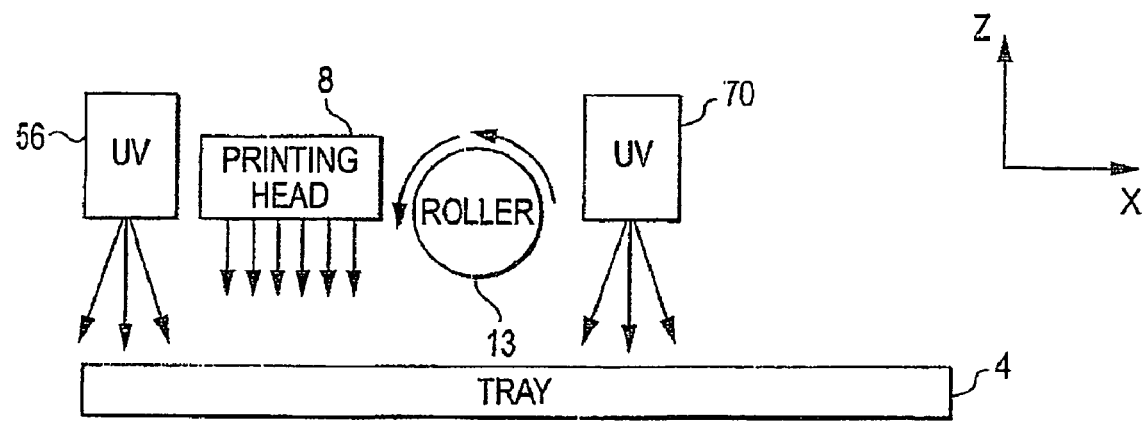
FIGS. 2A and 2B depict a printing head assembly and the order of a printing head assembly relative to a tray according to one embodiment of the present invention.
Figure 2B:
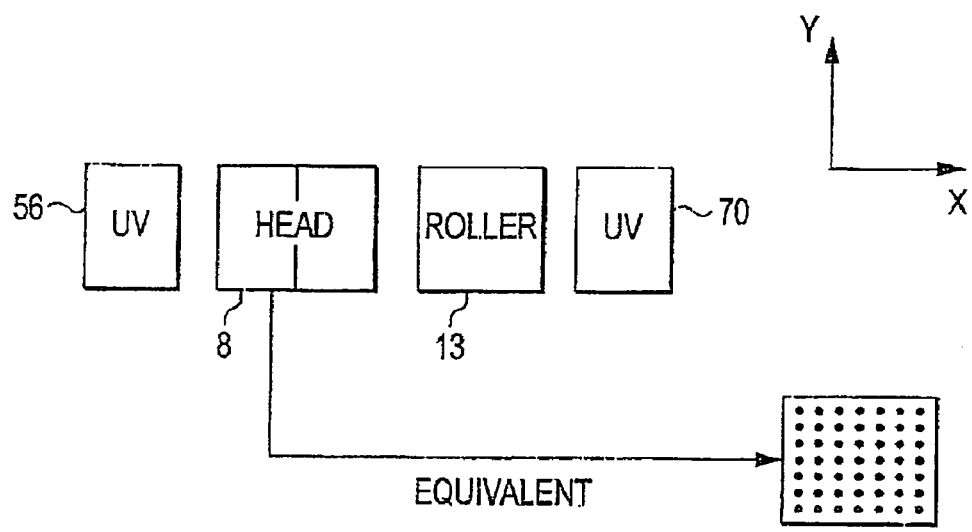

In one embodiment, the printing head 8 moves forward in the X-Y direction, depositing the materials in the course of its passage over the printing tray or printing area, in the predetermined configuration. This forward passage of the printing head 8 is followed by curing of the deposited material by a source of electromagnetic radiation. In the reverse passage of the printing head 8, back to its starting point for the layer just deposited (point 0 on the X-Y axes), an additional deposition of interface materials is carried out, according to predetermined configuration. In the reverse passage of the printing head 8, the second part of the layer may be straightened by a roller, which follows in the path of the printing head 8 in its reverse movement, and then the thus straightened layer is cured by, for example, by a source of electromagnetic radiation. FIGS. 2A and 2B depict a printing head assembly and the order of a printing head assembly relative to a tray according to one embodiment of the present invention. Referring to FIGS. 2A and 2B, printing head assembly 70 includes printing head 8, one or more curing unit(s) 56, and a leveling device (in this case, a roller) 13. In one embodiment, the order, from left to right, is curing unit 56, printing head 8, leveling device 13, and curing unit 56.

Once the printing head 8 has returned to the 0 position (starting point) in the X-Y axes, the printing tray 4 is lowered in the Z axis to a predetermined height. Alternately, the printing head 8 itself may be moved.

Other material dispensing methods may be used.

Figure 3:
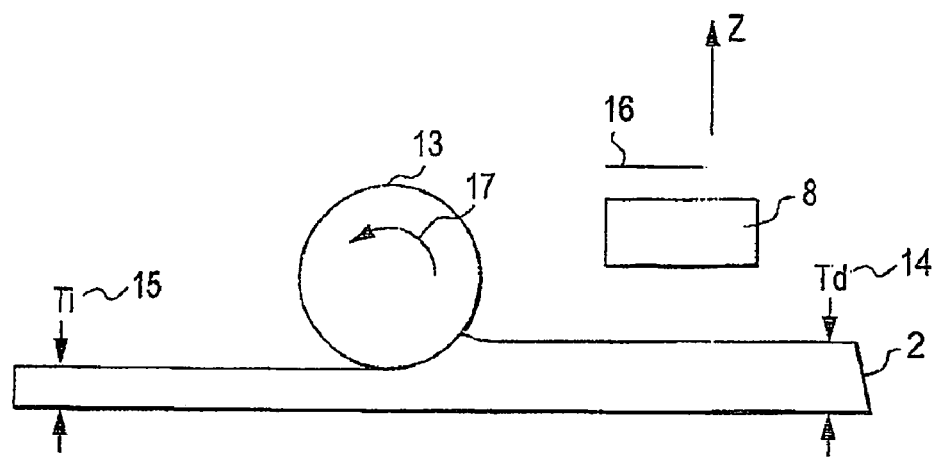
FIG. 3 is a schematic side view of the ink jet head of a three dimensional modeling device, dispensed layers and a roller, according to an embodiment of the present invention.

FIG. 3 is a schematic side view of the ink jet head of a three dimensional modeling device, dispensed layers and a roller, according to an embodiment of the present invention. Referring to FIG. 3, the thickness Td 14, dispensed by the printing head 8 may be greater than the final thickness required, or the thickness as defined or required by the CAD or COD data. A typically rotating roller 13, attached to the printing head 8, is so placed to trim the interface materials used (in this case BM and SM fluids, although other materials may be used) to their final thickness Tr 15. The leveling roller 13 turns in the direction 17, but may be moved in different manners. The height of tray 4 is controlled in such a way that the roller 13 is in touch with BM and SM only when the head and roller assembly (including, for example, roller 13, printing head 8, and other components, not shown) moves in direction 16. The roller 13 levels the upper level and, for example, may collect the surplus interface materials to a surplus bin (not shown). Embodiments of a leveling device that may be used with the system and method of the present invention are described in International Application WO 01/53105, published Jul. 26, 2001 and entitled "SYSTEM AND METHOD FOR THREE DIMENSIONAL MODEL PRINTING," assigned to the present assignee and incorporated herein by reference in its entirety. Other leveling devices may be used.

The typical 3D printing process introduces inaccuracy of, for example, ±0.3% of the part length, plus ±0.15 mm of edge, while typical requirements of accuracy in rapid prototyping are ±0.1% of the part length, plus ±0.05 mm. Other parameters or tolerances may be used. In certain embodiments of the present invention, various phenomena which affect the accuracy of the printed object are evaluated, and the COD is modified accordingly, or directions sent to the printer or printer components are modified, so as to compensate for the adverse effects so as to achieve more accurate objects.

In one embodiment, modifications are introduced to the COD (or other data or instructions) to take into consideration process parameters, interface material parameters and machine construction, or possibly other parameters.

Various embodiments may use combinations of various modification strategies, such as bulk modifications, surface modifications and/or Z start modifications, or other modification strategies, such as those designed to increase quality and/or decrease imperfections resulting from aspects of the build process or materials used. Other modifications may be performed, on other aspects of the data. Modifications in print data or print methods may be performed to increase overall quality.

Bulk modifications may be, for example, scale-adjustments in the X,Y and/or Z axes in order to compensate for dimensional (or size) inaccuracies in the final printed object, for example due to contraction of interface material (and thus general reduction in size of the model) during its cooling from printing temperature to room temperature. Adjustments in scale may differ among the axes. For example, adjustments to the Z axes may be smaller than for the X and/or Y axes, as printing of layers of interface material one on top of the other may in itself compensate for possible thermal influences and resultant shrinkage or contraction in the Z direction.

Selective surface modifications may refer to, for example, modifications made at the surfaces of the model being printed in order to compensate for inaccuracies. For example, where a support construction is dispensed adjacent to a model construction, diffusion of building material (BM) or modeling material and support material (SM) from the two constructions into one another may cause slight enlargement of the final object. An opposite phenomenon may occur for example where the surface of the model is not adjacent to a support construction, but in contact with the air, after curing or during cooling. The surface line of the object may retreat to an extent due surface tension phenomena. Other types of selective surface modifications may be performed.

Z start modifications may refer to, for example, compensation for differences in layer height in, typically, the lower layers. Other types of Z start modifications may be performed.

In one embodiment, an adjustment parameter may be calculated based on errors resulting from the materials used to build the object, e.g., shrinkage, diffusion of materials, materials flowing after deposition, etc.

Bulk Modifications

"Bulk modifications" in the COD or other data (such as instructions sent to printer components) may be used to compensate for dimensional changes due to, for example, temperature change of the object from printing temperature to room temperature, material curing, or mechanical inaccuracy of the printer. One embodiment includes a scale modification. For example, when a contraction of 0.25% is expected during printing due to part cooling, the scale modification to the data is a "stretch" or enlargement by 0.25%. Other tolerances or amounts may be used. The correction is typically performed in all three dimensions, but need not be. The scale factor may differ from one axis to another (X,Y,Z), some axes possibly having no correction in certain embodiments or under certain conditions, and is typically dependent on the print interface materials and the process parameters or other parameters. In one embodiment, the Z-axis requires a smaller scale modification than X and Y-axes since part of the thermal contraction is automatically compensated by the process of printing one layer on another. The controller 62 may use or calculate an adjustment parameter which may include, for example, a mode change, a scale modification, a stretch or shrinkage parameter, scale or percentage or adjustment to the various dimensions. Other adjustment parameters may be used.

Selective Surface Modifications

The model as printed may deviate from the intended model and the data due to, for example, changes in dimensions of the model due to factors directly affecting the model's surface/s. For example, materials may diffuse into one another, causing, for example, an enlargement of the model at the surface. Direct contact of the model surface with air may cause defects and deviations.

Figure 4A:
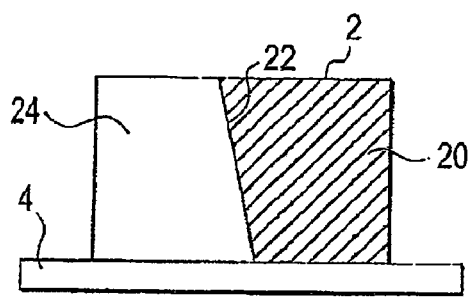
FIG. 4A is a schematic side view of a part built from BM and SM, according to an embodiment of the present invention.
Figure 4B:
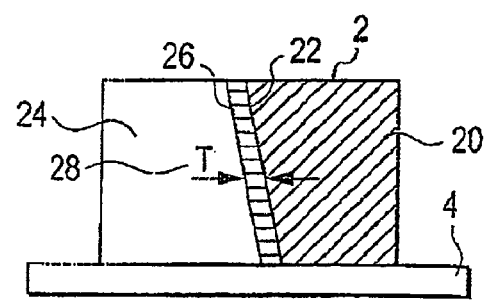
FIG. 4B is a schematic side view of diffusion of BM into SM, according to an embodiment of the present invention.
Figure 5:
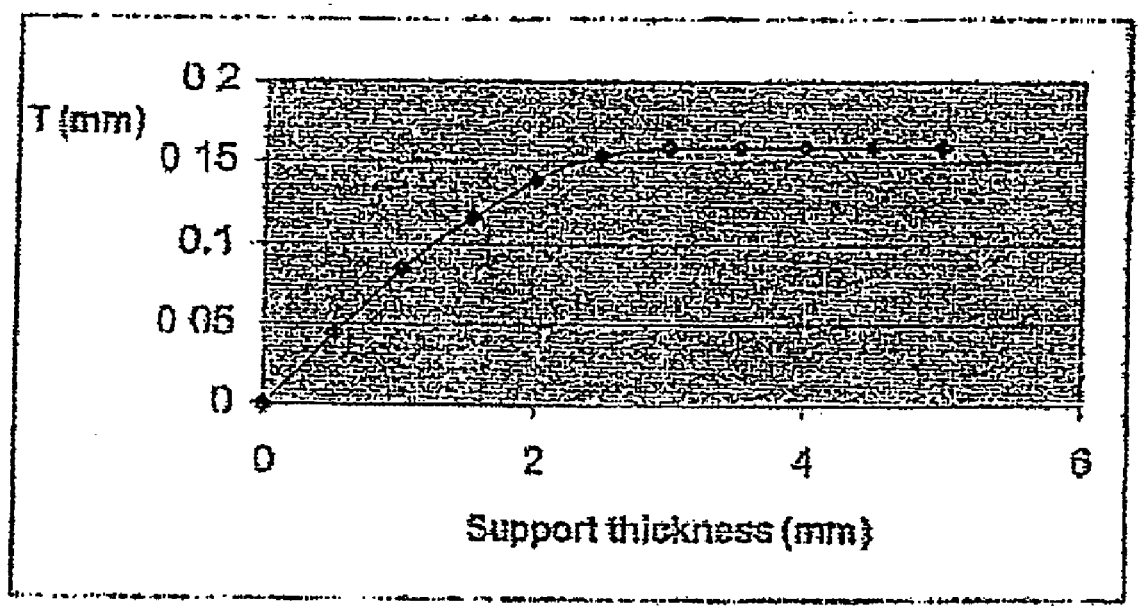
FIG. 5 depicts a sample adjustment amount for different measurements of the thickness of the support construction near line, according to one embodiment of the present invention.

In one embodiment, "Selective Surface Modifications" may be performed by introducing surface modifications to the COD or other data. FIG. 4A is a schematic side view of a part built from BM and SM according to one embodiment of the present invention. FIG. 4B is a schematic side view of diffusion of BM into SM in the support structure according to one embodiment of the present invention. Referring to FIG. 4A, a part of the object 2 resting on tray 4 is built by dispensing BM 20 to a line limit 22. In order to hold the BM 20 in place, support construction 24 is built left of line 22, and therefore SM is dispensed to the same line limit 22, thus BM 20 and SM 24 are in contact along line 22. Due to, for example, diffusion of BM 20 into SM 24, a thin layer of diffused BM 28 is produced, as shown in FIG. 4B. It may appear as if limit line 22 has moved to a new position 26. The layer 28, when cured, enlarges object 2 by the amount T. The thickness of the layer 28 is dependent, for example, on the print materials and on the thickness of the support construction near line 22, and is of a predictable value. In order to prevent the respective change in the object dimensions, COD may be modified by offsetting the dimensions of the object by, for example, the amount −T in regions where BM 20 is in direct contact with SM 24. Other data modification may be performed, in accordance with embodiments of the present invention. FIG. 5 depicts a sample adjustment amount T for different measurements of the thickness of the support construction near line 22, according to one embodiment. Of course other values may be used.

Other inaccuracies may be produced by, for example, SM diffusion, or other phenomenon, and such inaccuracies may be corrected by various embodiments of the present invention.

Figure 6A:
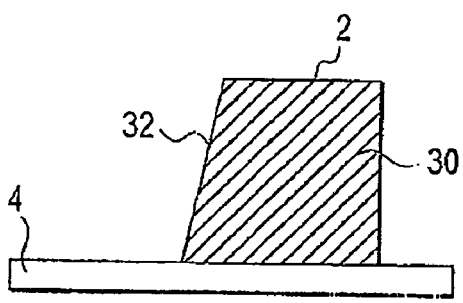
FIG. 6A is a schematic side view of a part built from BM, according to an embodiment of the present invention.
Figure 6B:
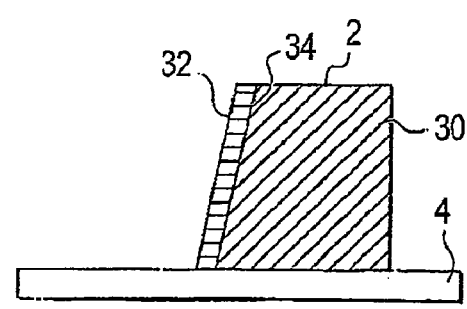
FIG. 6B is a schematic side view of a part built from BM after being cured, according to an embodiment of the present invention.

Another phenomenon is shown in FIGS. 6A and 6B. FIG. 6A is a schematic side view of a part built from BM, according to an embodiment of the present invention. FIG. 6B is a schematic side view of a part built from BM after being cured, according to an embodiment of the present invention. Referring to FIGS. 6A and 6B, a part of the object 2 resting on tray 4 is built by dispensing BM 30 to the limit line 32. In the example shown, beyond the limit line 32 no SM is dispensed, so that the BM 30 is in contact with air. Due to, for example, surface tension phenomena in the liquid or due to curing effects, the surface in contact with air may retreat when being cured. Thus, a new limit line 34 is formed, as shown in FIG. 6B. The amount of retreat depends on, inter alia, the type of interface materials.

The data (COD, STL or other data) may be modified (for example, by controller 62) in order to compensate for the surface enlargement or shrinkage offset at the model surface in the X-Y directions. Generally, the correction (or offset) depends on whether the model surface is adjacent to support material or air. It also may depend on the support thickness near the model surface, or other factors. The offset may be continuously changed from that corresponding to air at very small support thickness, to that corresponding to support of thicknesses larger than, for example, 3 mm.

The required compensation may be achieved by, for example, "rubbing" out a thin layer from, typically, all the object's 2 surfaces (typically except for horizontal surfaces). In one embodiment, the thickness of the rubbed or removed layer is such that the thickness of the intersection of the layer with any of the printed slice cross-sections is a predetermined value. This value may be designated by "offset". Offset may differ from regions where the object 2 is surrounded by SM or by air (the controller 62 may determine what surrounds the object 2 where from, for example, CAD, COD, STL or other data) and may depend on the type of printed model, support materials and on process parameters or other parameters or data. Offsetting may harm details of small size and therefore for small details the smaller the size of a detail, the smaller the offset.

A user may input data regarding a retreat amount, an amount for compensation, etc., or such amounts may be determined by, for example, controller 62. The controller 62 may use or calculate an adjustment parameter which may include, for example, adjustment dimensions, a layer to be reduced, an offset, etc. Such adjustment parameter may be calculated based on diffusion characteristics of materials used, or may be based on the type of materials used. The adjustment parameter for a section of the object may be calculated based on whether or not support material is to be dispensed adjacent to that section of object. Other adjustment parameters may be used, and an adjustment parameter may be based on and may include multiple different types of information.

Z Start Modification

FIG. 7A is a side view of the initial space 44 between the leveling device 13 and the tray or table, according to an embodiment of the present invention. FIG. 7B is a side view of the leveling device 13 relative to layers of material dispensed beneath the height h 42 at which the material first comes into contact with the leveling device, according to an embodiment of the present invention. FIG. 7C is a side view of the leveling device relative to tray 4, where tray 4 typically moves down along the Z axis (each Z adjustment Tr shown by a dotted line), according to an embodiment of the present invention. FIG. 7D is a side view of a pedestal built up to h height and beyond, where the leveling device first comes into contact with the interface material, and indicating the difference in depth of the layers 'leveled' by the leveling device (leveled layers of pedestal shown above h height with leveled layers 6 of model 2 above the pedestal 40), according to an embodiment of the present invention.

While the leveling device is typically a roller 13, other leveling devices, such as blades or scrapers, may be used. In the 3-D printer the layers 6 are typically dispensed one on top of the other, as shown in FIG. 1A. Before a new layer is dispensed, the tray 4 typically moves down along Z-axis, as may be seen in FIG. 7C. Other methods of Z-axis adjustment may be used, such as moving the printing head 8. Each increment in Z direction typically corresponds to the final layer thickness Tr 15 (FIG. 7C). The actual dispensed layer thickness Td 14 (shown in FIG. 7B), may be thicker than the final thickness required. This extra thickness provides surplus interface material for leveling the upper layer prior to curing.

Z direction inaccuracies may be due to, for example, an initial distance in Z direction of the leveling apparatus (e.g., rotating roller 13) from the printing tray or table 4. Leveling may be required for compensation for, for example, weak nozzles, slow fluidity etc. Leveling may be achieved in one embodiment by using rotating roller 13; other leveling devices may be used. The final layer thickness Tr 15 (FIG. 7C) typically corresponds to the Z step between adjacent slice plans of the sliced COD. In order to assure no friction of the leveling roller 13 with the tray, the roller is typically initially located at a specified space d 44 from the tray, and therefore is not in contact with the first few layers of interface material during the build process. The consequence may be that the initial layers are thicker than desired.

Referring now to FIG. 7B, h 42 denotes the height from the tray 4 to the level at which the roller 13 is in touch with the dispensed interface material. Td is the thickness of dispensed layer before leveling and n is the number of layers deposited.

In FIG. 7C, Tr is the step size of tray 4 movement in the Z direction from slice to slice (e.g., the thickness of each layer 6 after being leveled). A slice is denoted 1, where the first slice is i=1, the second i=2 and so on up to i=n. H 42 denotes the height from the tray 4 to the level at which the roller 13 is in touch with the dispensed interface material. Thus as may be seen in FIGS. 7B and 7C, the following relations can be described (other relationships may be used in other embodiments):

$$hi = Tr \times i + d \text{ for } i=1,2, \ldots n.$$

If n is the slice number which is the first to touch the roller, the following two equations hold for i=n:

$$h = h_n = Tr \times n + d = Td \times n$$

hence $$n = d/(Td-Tr), \text{ and}$$

$$h = Td \times d/(Td-Tr)$$

Where: d=the space between the leveling roller device 13 and the machine tray 4 prior to printing, n=number of unleveled layers, Td=thickness of dispensed layer before leveling, and Tr=step size of the tray 4 movement in the Z direction from slice to slice (e.g., the thickness of each layer 6 after being leveled).

According to one embodiment of the system and method according to the present invention, a device forms a pedestal of support construction 40 (FIG. 7D), typically to the height h at which the base of the leveling device (e.g., a roller) 13 comes into contact with the deposited material. The height of the pedestal 40 may in one embodiment of the present invention exceed height h, according to the requirements of the model being built. The printer 1 commences printing of the object 2 on top of the thus-constructed pedestal. Thus the leveling device 13 makes contact with all layers and is able to level all to a consistent thickness, starting from the first laid layer of modeling construction. Alternately, the printer 1 may adjust the space between adjacent slice planes of the initial (bottom) layers in the sliced COD according to the expected unleveled thickness. Other types of Z start modifications may be performed.

According to one embodiment, the height of the pedestal 40 is such that the leveling roller 13 is in complete touch with at least the last dispensed layer of the pedestal 40. The pedestal 40 height is typically chosen as being equal or larger than h of the expression above. The support pedestal 40 is added into the COD as, for example, a Z-offset. The structure of the pedestal 40 may generally differ from normal support structures, and may differ from that shown.

According to one embodiment, for the area below where the leveling device is first active, the object data may be "sliced" and converted into layers based on the larger, un-leveled thickness (e.g., Td), rather than the smaller, leveled thickness (e.g. Tr). When the object data is converted from, e.g., CAD data, an initial, lower, set of layers may be thicker than an upper set of layers. Thus, when printing, the tray 4 may be moved according to the larger amount. Such computation and tray movement may be factored into the adjustment parameter.

According to another embodiment, an adjustment to the COD or other data may be introduced by, for example, determining the space (Td) between adjacent 'slice planes' of the initial layers in the sliced COD, from the bottom of the object 2 to height h. The space between the rest of the slice planes is typically left equal to Tr. The number of layers having a thickness of unleveled dispensed layers is typically n (see above).

In one embodiment, the adjustment parameter includes instructions to use a large step between the layers when adjusting layer data corresponding to the lower part of the object in, for example, the Z direction according to, for example, the tray step movement from layer to layer and the average thickness of the injected material, up to a certain height. The adjustment parameter may include instructions to produce a first layer thickness (by, for example, moving the tray 4 in a first step distance) between the slices when preparing the sliced printable data in the lower part of the object. This is performed up to a certain height. A second layer thickness is used above that height. Typically, the first thickness is substantially equal to the average thickness of the deposited material in a slice before leveling, and the second thickness is substantially equal to the tray 4 step movement from slice to slice, or to the layer thickness with leveling.

The controller 62 may use or calculate an adjustment parameter which may include, for example, a Z-offset, various adjustments to dimensions, a number of start layers, an initial space between a leveling apparatus and a support tray, etc. An adjustment parameter may include instructions for contracting a set of lower layers, for example according to the tray step movement from layer to layer and the average thickness of the injected material, up to certain height. Other adjustment parameters or methods of calculating such parameters may be used. In alternate embodiments, the initial layers need not be made of support material.

Vertical Thin Walls, Pins, or Other Structures

When printing models with thin walls or pin-like parts, or other thin or narrow structures, the top layers, e.g., the interface materials laid at the top of such thin walls or pin-like parts, may take on a rounded shape. Where thin and thick sections are intended to have equal height, the thin sections may be built higher than the thick sections. Such rounding or height errors may occur to an extent at the top surface of all models, as the jetted interface material may be in liquid form having surface tension phenomena, and may therefore not 'adopt' 90° edges easily. In thin walls, rounding of the two opposing edges may overlap each other, causing the height of the wall in a slice to protruding slightly above the slice plane. The leveling device may collide ("knock") with such a protrusion when leveling the slice, possibly causing breakage to the object being built.

In one embodiment of the present invention, when designing configuration or computing data for thin walls or pins, or other thin structures, vacant pixels or areas (areas where material is not deposited) in the X-Y axes may be configured in the interior or center of vertical thin walls or pins (optimally 1 to 4 pixels wide, although other numbers may be used) to allow for spread of excess interface materials into the 'vacant' areas, and thus lessen rounding or the rounded accumulation of materials at the top surface of the layers of interface material. A "thin" portion may be a portion where, for example, the intersection of the wall with XY plane forms a thin line.

Figure 8:
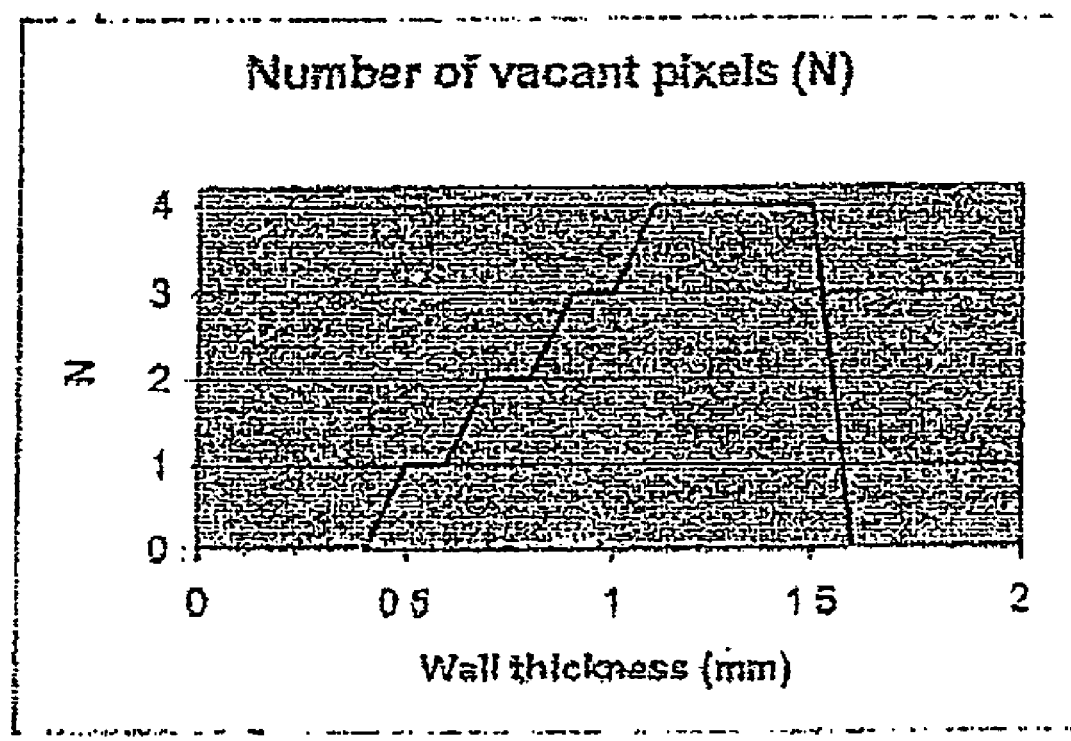
FIG. 8 depicts an adjustment function N according to one embodiment.
Figure 10A:
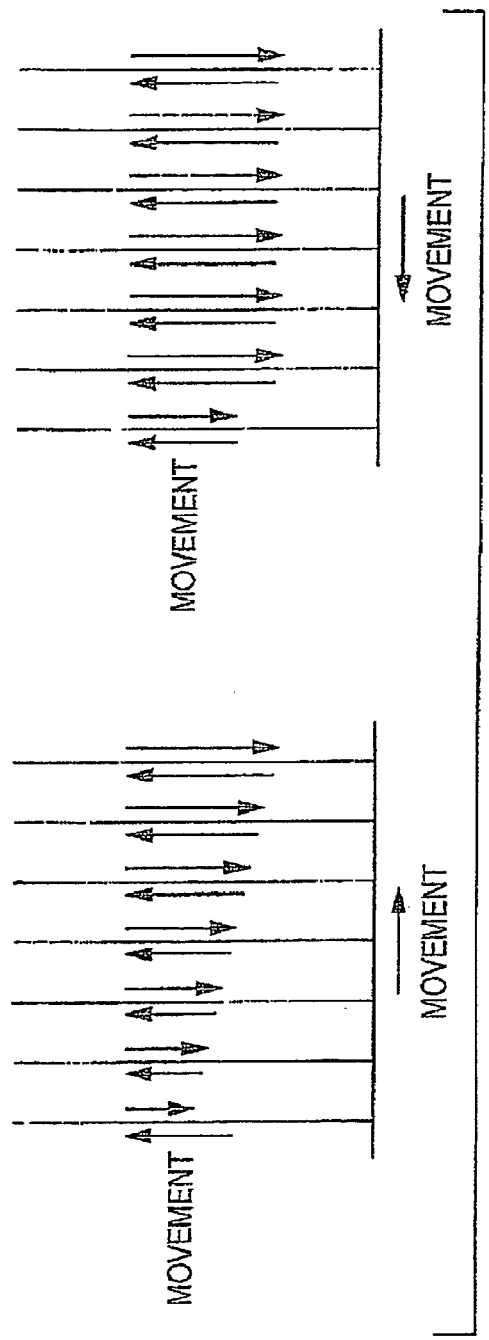
FIG. 10A and FIG. 10B depict patterns of print head movement according to various embodiments of the present invention.
Figure 10B:
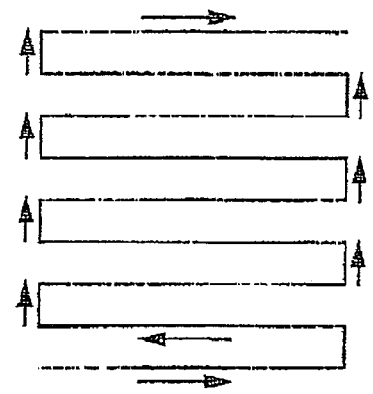

In one embodiment, a function N (wall thickness) may be used by the controller 62 to calculate the area or the number of pixels, if any, to leave vacant from a central area of a thin structure. FIG. 8 depicts an adjustment function N according to one embodiment; other functions may be used. Referring to FIG. 8, depending on the thickness of the structure, a certain number of pixels N may be omitted. Typically, N expresses a width; the length is as appropriate, given the structure (e.g., wall, pin, etc.). In the embodiment shown, pixel size is 21 micrometers. Other pixel sizes may be used, and the omitted material may be expressed as an area rather than a number of pixels. The controller may recognize (from the data, e.g.) thin objects such as walls and pins, and modify the data so that the COD includes the required vacant pixels or areas, or introduce the vacant pixels in other data, such as when preparing the sliced COD.

In one embodiment controller 62 may for example modify or adjust COD or sliced COD data to compensate for inaccuracies caused by the rounding of interface material in the center of each layer comprising thin walls or pins or other very narrow objects.

The controller 62 may alternatively modify or adjust COD or sliced COD data to compensate, for example, for a number of non-printed pixels or other data. The controller 62 may modify or adjust COD or sliced COD data which may include, for example, adjustments to dimensions, or pixels or areas to be omitted or left vacant, or other data or instructions. The adjustment parameter may be calculated in order to prevent rounding of an edge of the object. Other adjustment parameters may be used to effect such corrections.

Drop Flight Angle

Dripping of interface material may occur at, for example, vertical walls of the model, especially when the walls are perpendicular to the X motion of the print head 8. The flight of drops that is not perpendicular to the tray 4 may be responsible of this phenomenon. Although the drop is typically injected perpendicularly to the tray 4, the flight direction of the drop may not be perpendicular to the tray 4 because of, for example, the X motion of the print head 8 during printing.

Adjustment in, for example, the X direction between the forward and reverse motions of the printing head 8 may correct for errors such as dripping of interface material at the edge walls of the model 2. The adjustment may reduce deviation of the drop flight trajectory, for example deviations out of the edge point of the model wall. Proper adjustment may be achieved, for example, by adding a position offset ('back offset') which adjusts X position where the droplets land on the model 2. In a printing situation where drops are intended land over the same pixel or position of the model 2 in both forward and backward movements, the offset may adjust the print head 8 position when injecting the respective drops during forward and backward movements. Note as with "X" and "Y", forward and backward are relative terms, and may be interchangeable across different embodiments. FIGS. 9A, 9B and 9C depict the path of drops when various offsets are used, according to an embodiment of the present invention. Referring to FIG. 9A, when a drop is dispensed in either the forward or backward direction, with the head position being the same, the two drops continue in, respectively, the forward or backward direction until landing on the slice plane, but not landing on the same spot as desired per the data. Referring to FIG. 9B, when an offset is added to the position at which the drop is dispensed, its landing position on the surface of the object 2 may be altered in a way that the drops land on the theoretical edge 200 of the object in the slice plane. Due to rounding of the model edge (see "Vertical Thin Walls, Pins, or Other Structures," above), the model edge 202 may retreat from the theoretical edge 200, and therefore some droplets may miss the object 2, causing dripping on the object wall or, possibly, a phantom wall at the bottom of the model. Referring to FIG. 9C, the proper offset results in, for a given edge pixel 204, the landing position of a drop 206 during both its forward and backward pass being substantially the same on the actual wall's edge 202.

Offsets to compensate for the drop flight angle or the velocity of the print head may be in the form of, for example, a position adjustment or a timing (e.g., release time) adjustment. Offsets may be in the form of a whole or fraction of a pixel, as is suitable with the data format used. Offsets may be adjusted or calculated based on, for example, the speed of the print head, the distance between the head and the surface of the object, or other parameters. Offsets may be used with embodiments where the head movement is not a "back and forth" method or where drops are not dispensed to the same position from more than one different direction.

Figure 11:
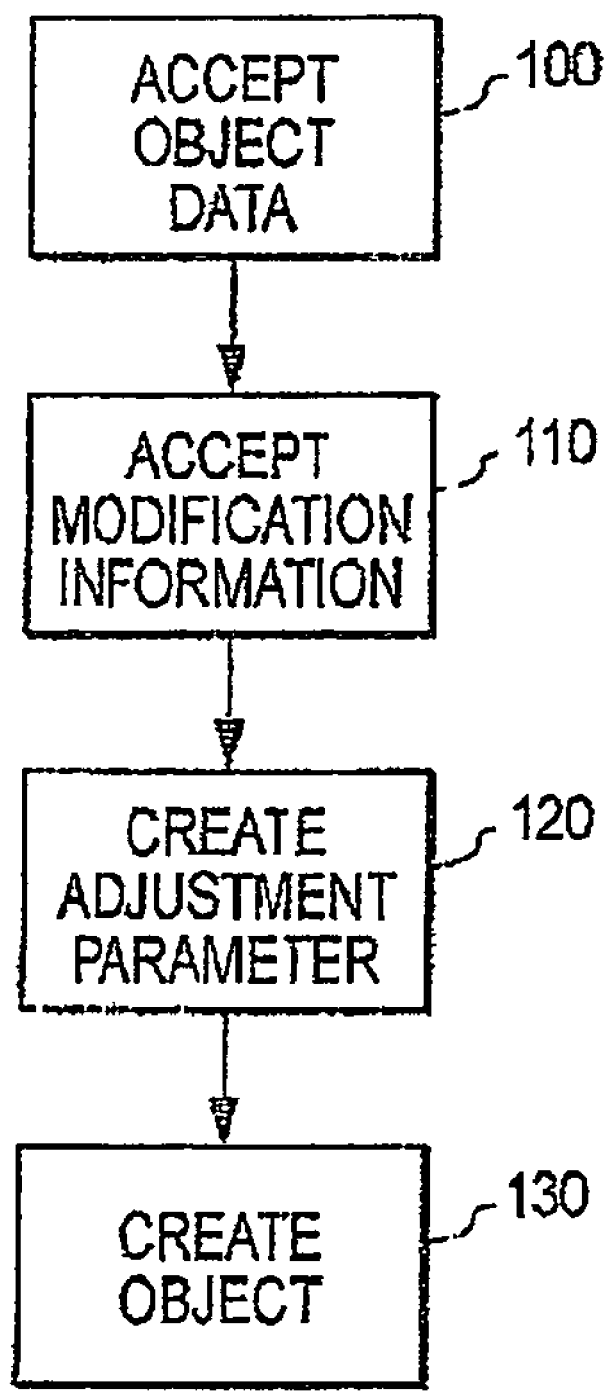
FIG. 11 depicts a series of steps according to one embodiment of the present invention.

FIG. 11 depicts a series of steps according to one embodiment of the present invention. Steps may be omitted or modified, and other steps or series of steps may be used.

Referring to FIG. 11, in step 100, a three dimensional printer accepts data representing a three dimensional object.

In step 110, the printer may accept data affecting a modification to the object data. For example, the printer may accept a material type, a set of nozzles, a user request, a modification parameter, etc. Alternately, such data affecting a modification may be "built in" or stored in software in the printer, and thus step 110 may not require "accepting" data. The data accepted may include an indication of mode from a user.

In step 120, the printer may calculate an adjustment parameter based on the data received in step 110. The adjustment parameter may be, for example, a simple number or set of numbers, a set of instructions, or other data. Alternately, the adjustment parameter may be taken from data input or stored in step 110, without calculation or modification.

In step 130, the printer prints the object according to the data accepted or stored in steps 100 and 110 and according to the adjustment parameter. Typically, the printer lays down one or more materials according to such data and parameters. The printer may cause such material to solidify—for example, the material may be cured. An adjustment parameter may be created or modified during printing.

The controller 62 may use or calculate an adjustment parameter which may include, for example, a map of nozzles, instructions for a print head shift, alterations to print head movement, offsets to print data, adjustments or instructions relating to print quality or print effects, alterations in the way that the input data is converted to print data, etc. An adjustment parameter may provide instructions to adjust the position of certain drops relative to drops dispensed in lower layers. A print head may be moved relative to the surface of the object (typically in a Z direction) by, for example, one of moving the print head or moving the object, and the adjustment parameter may provide instructions to adjust movement in one or more of the X, Y and Z directions. The adjustment parameter may adjust the position of drops based on movement of the drops between drop dispensing and the drops contacting the object surface. An adjustment parameter may provide instructions for the dispensing of a number of initial layers, on which the object may be built. Adjustment parameters may have other formats and include other data. An adjustment parameter may be created or modified after the start of printing.

Typically, for bulk modifications, selective surface modifications, or any of the other modifications discussed herein, controller 62, operating based on software 68, modifies the data that is sent to the printer components, or modifies data used to generate the instructions sent to the printer components (e.g., COD data or STL data, or other data). Controller 62 may accept input data such as a shrinkage scale or percentage, a number of initial layers of SM, a Z start value, a thickness to remove from a removed layer, or other values, as appropriate. The controller 62 may accept a mode from a user, such as a quality mode or corrective mode; methods and systems for accepting user data to electronic devices are well known. The controller 62 may accept such data from a user or automatically, via sensors that may record, for example, the type of material used, temperature levels, malfunctioning nozzles, etc. The input data may be, for example, a user selection to include certain compensations in the calculations, a mode change, etc. Memory 66 may store such data, such as user selection or a map of nozzles.

Alternately, such data need not be "accepted" and appropriate data may be stored by, for example, memory 66. E.g., an adjustment parameter may be stored in printer 1 more or less permanently.

An adjustment parameter may be based on and may include different types of information While the invention has been described with respect to a limited number of embodiments, it will be appreciated that many variations, modifications and other applications of the invention may be made which are within the scope and spirit of the invention.

Embodiments of the present invention may include apparatuses for performing the calculations and operations herein. Such apparatuses may be specially constructed for the desired purposes or may comprise general purpose computers selectively activated or reconfigured by a computer program stored in the computers. Such computer programs may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions.

Calculation or data manipulation processes presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems appears from the description herein. In addition, such calculation or data manipulation processes embodiments are not limited to any particular programming language. It will be appreciated that a variety of programming languages may be used to implement the teachings of the invention as described herein.

Unless specifically stated otherwise, as apparent from the discussions herein, it is appreciated that throughout the specification discussions utilizing terms such as "estimating", "processing", "computing", "calculating", "determining", or the like, typically refer to the action and/or processes of a computer or computing system, or similar electronic computing device (e.g., a "computer on a chip" or ASIC), that manipulate and/or transform data represented as physical, such as electronic, quantities within the computing system's registers and/or memories into other data similarly represented as physical quantities within the computing system's memories, registers or other such information storage, transmission or display devices.

What is claimed is:

1. A method for building a three-dimensional object by depositing materials onto a printing surface, layer upon layer, within a printing system, the method comprising:
   providing data representing a three-dimensional object, the data comprising X, Y and Z coordinates;
   calculating an adjustment parameter to compensate for a height error caused by material rounding at a top surface of thin walls or structures, said adjustment parameter including a set of non-printed pixels in the interior of said thin walls or structures;
   modifying the data representing the three dimensional-object based on the adjustment parameter; and
   printing at least one layer of the three-dimensional object according to modified data.

2. A method according to claim 1, comprising applying the set of non-printed pixels to prevent thin walls or structures from being built higher than thicker walls or structures.

3. A method according to claim 1, wherein the number of said non-printed pixels is a function of thickness of walls or structures.

4. A method according to claim 1, comprising calculating the number of the non-printed pixels based on whether a support material is to be dispensed adjacent to a section of the object, the non-printed pixels being for the section of the object.

5. A system for building a three-dimensional object, the system comprising:
   a controller capable of accepting data representing a three-dimensional object, calculating an adjustment parameter to compensate for a height error caused by material rounding at a top surface of thin walls or structures, the adjustment parameter including a set of non-printed pixels in the interior of said thin walls or structures and modifying in the data representing the three dimensional-object according to the adjustment parameter;
   a printing head connected to the controller capable of depositing materials onto a surface according to said data to form the three-dimensional object; and
   a curing unit.

6. A system according to claim 5, wherein the set of non-printed pixels is used to prevent thin walls or structures from being printed higher than thicker walls or structures.

7. A system according to claim 5, wherein the number of non-printed pixels is a function of wall thickness.

8. A system according to claim 5, wherein the number of non-printed pixels is based on whether a support material is to be dispensed adjacent to a section of the three-dimensional object.

* * * * *